US007117078B1

(12) United States Patent
Gangopadhyay

(10) Patent No.: US 7,117,078 B1
(45) Date of Patent: Oct. 3, 2006

(54) INTAKE OXYGEN ESTIMATOR FOR INTERNAL COMBUSTION ENGINE

(75) Inventor: Anupam Gangopadhyay, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/112,444

(22) Filed: Apr. 22, 2005

(51) Int. Cl.
*F02D 41/00* (2006.01)
*G06F 19/00* (2006.01)

(52) U.S. Cl. ........................ 701/103; 701/108; 123/672

(58) Field of Classification Search ................ 701/103, 701/104, 114, 108, 109; 123/672, 480
See application file for complete search history.

(56) References Cited

U.S. PATENT DOCUMENTS 5,714,683 A 2/1998 Maloney
5,753,805 A 5/1998 Maloney
5,931,140 A 8/1999 Maloney
6,016,460 A 1/2000 Olin et al.
6,508,241 B1 * 1/2003 Miller et al. ................ 123/672
2006/0020386 A1 * 1/2006 Kang ......................... 701/114

FOREIGN PATENT DOCUMENTS

JP 10-77883 A * 3/1998

OTHER PUBLICATIONS

Nakayama et al., A New Dynamic Combustion Control Method Based on Charge Oxygen Concentration for Diesel Engines, SAE Intl., 2003-01-3181, USA.
Diop et al., Intake Oxygen Concentration Estimation for Diesel Engines, IEEE, International Conference on Control Applications, Aug. 22-27, 1999, USA.

* cited by examiner

*Primary Examiner*—Hieu T. Vo
(74) *Attorney, Agent, or Firm*—Kathryn A. Marra

(57) ABSTRACT

An internal combustion engine system includes an intake manifold, a combustion chamber, an exhaust manifold and exhaust gas recirculation apparatus for recirculating a portion of the exhausted gases from the exhaust manifold to the intake manifold. An estimate intake manifold oxygen concentration is determined from the air fraction within the intake manifold which is determined from an engine system model that provides interdependent air mass fractions at various locations within the engine system.

14 Claims, 5 Drawing Sheets

INTAKE OXYGEN ESTIMATOR FOR INTERNAL COMBUSTION ENGINE

TECHNICAL FIELD

The present invention is related to lean burn internal combustion engines. More particularly, the invention is concerned with estimations of intake manifold gas composition.

BACKGROUND OF THE INVENTION

Most of the time a diesel engine operates significantly lean of stoichiometry wherein gases expelled from the combustion chambers are characterized by excess oxygen. Richer air/fuel ratios may be controlled during brief periods for the purposes of particulate or oxides of nitrogen (NOx) trap regenerations where such apparatus are utilized as part of the engine emission control system. Diesel engines may also use exhaust gas recirculation (EGR) in the emission controls to reduce the NOx produced in the diesel engine's combustion process by lowering the effective combustion temperature and reducing the oxygen component of the cylinder charge.

Oxygen concentration in the intake manifold is a key parameter in controlling the make up of the exhaust gases expelled from a combustion chamber. Exhaust gases recirculated back into the intake manifold will vary the oxygen concentration in the intake manifold and, in turn, the oxygen concentration in the intake manifold will affect the oxygen concentration in the combustion chambers established during cylinder filling periods. Therefore, the total pre-combustion trapped charge within the combustion chamber may contain different amounts of oxygen depending on the prevailing intake concentration of oxygen during the cylinder filling period. The amount of oxygen affects both the amount of fuel that can be injected before unacceptable levels of particulate emissions (i.e. smoke) are produced and the level of NOx production.

Combustion controls which rely upon post-combustion oxygen sensing are generally satisfactory for managing steady state or slowly varying oxygen levels. EGR dynamics are therefore limited by the effectiveness of such controls in accounting for rapid changes in EGR levels. Additional factors including intake temperature and pressure also affect the oxygen levels. Intake boosting, such as by turbocharging or supercharging, also have limited dynamics in accordance with the effectiveness of such controls in accounting for rapid changes in boost levels.

Ideally, pre-combustion oxygen sensing in the intake manifold would alleviate much of the dynamic limitations mentioned by providing substantially instantaneous intake oxygen concentration measurements thus accounting for rapid changes in EGR concentrations and intake boost pressures. However, known wide range oxygen sensing technologies are effective at substantially elevated temperatures. Whereas they work well in a high temperature exhaust environment, substantial heat would need to be added thereto to achieve light-off in the much cooler intake environment. A supplemental electrical heater would likely result in an unacceptably high power consumption penalty. Also, known wide range oxygen sensing technologies are effective at substantially ambient pressure levels and require proper pressure compensation to produce accurate oxygen concentration information.

SUMMARY OF THE INVENTION

This invention enables the estimation of instantaneous levels of oxygen at various locations within an internal combustion engine system that uses exhaust gas recirculation, including within the intake manifold. A real-time, transient-responsive model of the internal combustion engine includes interdependent sub-system models effective to estimate air or oxygen fractions at various locations within the system including at combustion chamber exhaust ports and intake and exhaust manifolds.

An internal combustion engine system includes a combustion chamber, an exhaust manifold, an intake manifold and exhaust gas recirculation apparatus for variable recirculation of exhaust gases from the exhaust manifold to the intake manifold. A method for estimating oxygen concentration at points within the internal combustion engine system includes reticulating the engine system into a plurality of interconnected engine sub-systems. The interconnected engine sub-systems are modeled to provide interdependent air mass fractions at predetermined points within the internal combustion engine. Oxygen concentration at the predetermined points within the internal combustion engine are then estimated as a function of the respective modeled air mass fractions at said predetermined points. Preferably, an empirically determined data set correlating combustion chamber air mass fraction to a plurality of engine operating parameters is used to model the air mass fraction at the combustion chamber exhaust port. Engine speed, fuel mass flow, combustion timing, intake manifold pressure, exhaust manifold pressure, intake manifold temperature and intake manifold air fraction are among the engine operating parameters used in the empirical determination of the data set.

A method for estimating oxygen concentration in the intake manifold of an internal combustion engine includes reticulating the engine system into a plurality of interconnected engine sub-systems including an intake manifold, an exhaust manifold, an exhaust gas recirculation apparatus and combustion chambers. All significant mass flows corresponding to the engine sub-systems are identified, including combustion chamber exhaust mass flows. Similarly, all significant pressure nodes corresponding to the engine sub-systems are identified, including the intake manifold and the exhaust manifold. Interdependent air mass fractions at the identified pressure nodes, including at the intake manifold, and at the combustion chamber exhaust mass flow are modeled. Oxygen concentration in the intake manifold is then estimated as a function of the modeled air mass fraction at the intake manifold. The engine sub-systems may further include intake pressure boost apparatus such as turbochargers and superchargers. The modeling of the interdependent air mass fractions at the identified pressure nodes may further include modeling of the air mass fraction at the exhaust manifold and the modeling of the air mass fraction at the intake manifold may include determining recirculated exhaust gas mass flow and determining recirculated exhaust gas air mass flow based on the recirculated exhaust gas mass flow and the air mass fraction at the exhaust manifold. Combustion transport delay is preferably accounted for in the modeling of the air mass fraction at the combustion chamber exhaust mass flow, and exhaust gas recirculation transport delay is preferably accounted for in the determination of recirculated exhaust gas mass flow.

A control system for an internal combustion engine includes means for providing respective measures of a plurality of engine operating parameters and a microprocessor based controller includes computer code stored in a storage medium for applying the engine operating parameter measures to a model to estimate interdependent air mass fractions at locations within the internal combustion engine. The control system further includes at least one actuator controlled in response to at least one of the interdependent air mass fractions. One of the interdependent air mass fractions is estimated at the intake manifold and an actuator may comprise an intake boost control actuator (e.g. variable geometry turbocharger, variable nozzle turbocharger) or an exhaust gas recirculation actuator.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
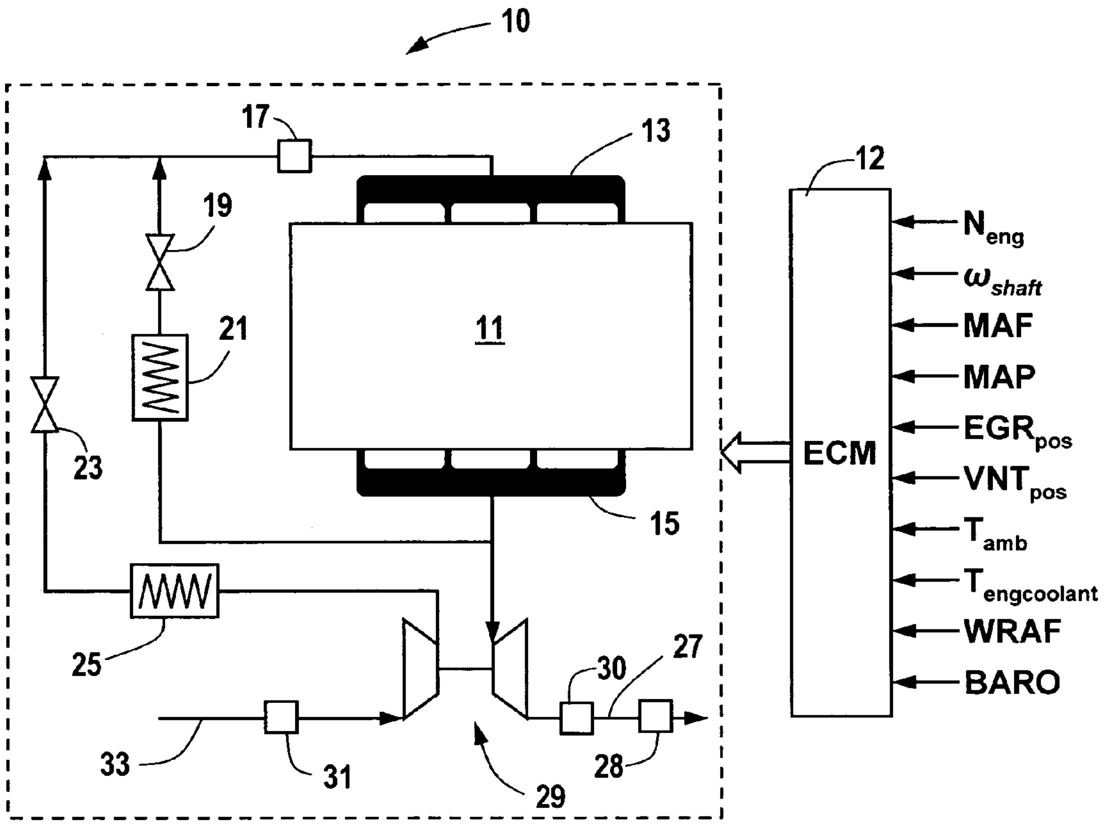
FIG. 1 is a schematic illustration of an internal combustion engine system and engine controller in accordance with one embodiment of the present invention.
Figure 4:
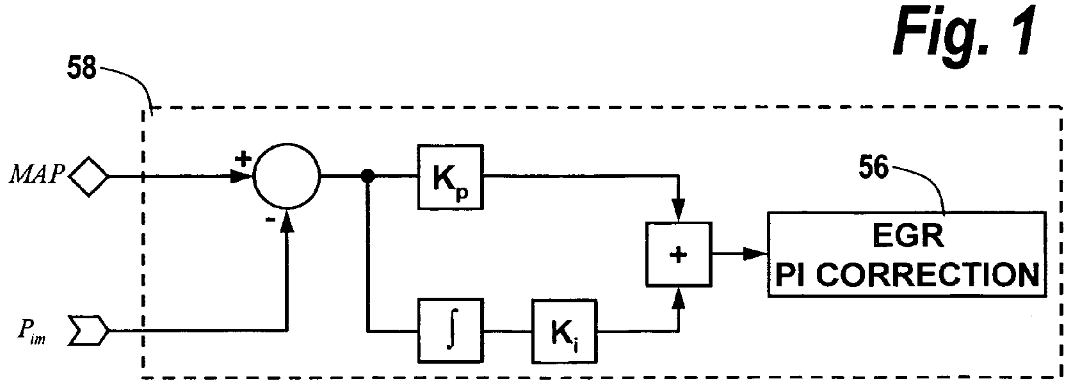
FIG. 4 is a proportional-integral control for providing a closed loop correction term to the EGR and cooler model in accordance with the present invention.
Figure 5:
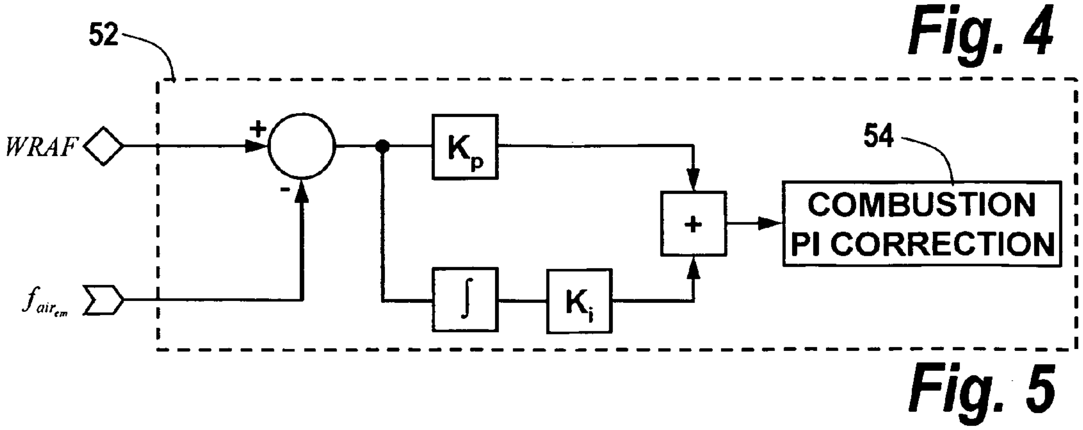
FIG. 5 is a proportional-integral control for providing a closed loop correction term to the combustion chamber model in accordance with the present invention.

A preferred embodiment will now be described in conjunction with application of the present invention to a turbocharged diesel engine system, generally labeled 10 in FIG. 1. The diesel engine system includes engine 11 having intake manifold 13 and exhaust manifold 15, each of which includes a plurality of runners (not separately labeled) corresponding in number to the number of individual cylinders of the engine 11. Intake air at substantially atmospheric pressure is ingested at intake 33. Conventional mass airflow sensor (MAF) 31 is coupled to the flow of ingested air upstream from air-cooled turbocharger 29 for providing a signal indicative of the mass flow rate of inducted air. Turbocharger 29 is adapted to provide a variable boost pressure for a given exhaust flow in accordance with well known variable vane geometry or variable nozzle geometry, commonly referred to as variable geometry turbocharger (VGT) and variable nozzle turbocharger (VNT), respectively. Further reference to turbocharger is consistent with VNT 29 and the particular embodiment of the invention utilizing a variable nozzle turbocharger. Other boost technologies, including conventional and wastegate turbochargers, compounded and two-stage turbochargers and superchargers, for example, may be used in practicing the present invention. The airflow is compressed by turbocharger 29 and provided to intercooler 25. Further downstream is conventional electrically controllable intake throttle valve (ITV) which may take the form of a stepper motor controlled butterfly valve or other actuator/valve combination adequate for varying the intake restriction. Continuing downstream is conventional manifold absolute pressure (MAP) sensor 17 for providing a pressure signal therefrom. Exhaust gases are expelled from individual cylinders to a corresponding plurality of runners (not separately labeled) and into exhaust manifold 15. Exhaust gases are channeled from the exhaust manifold to drive the turbine of turbocharger 29 and thereafter finally exhausted through exhaust line 27 to atmosphere subsequent to passing through exhaust gas after treatment devices 28 such as NOx traps, catalytic treatment devices, particulate filters and various combinations thereof. Downstream of the turbine is conventional wide range air-fuel (WRAF) sensor 30 for providing an oxygen content signal therefrom. Also, after the exhaust manifold but preceding the turbocharger, a portion of exhaust gas flow is directed through an exhaust gas recirculation path to conventional exhaust gas cooler 21 and electrically controllable exhaust gas recirculation (EGR) valve 19, typically but not necessarily, a solenoid-actuated pintle valve or a DC motor driven valve. The flow through the exhaust gas recirculation path continues downstream of EGR valve 19 to be mixed with the fresh intake air flow to establish the ingested cylinder charge gas mix.

Integral to the implementation of the present invention and the engine system is a conventional microprocessor based engine or powertrain control module (ECM) 12 comprising such common elements as microprocessor, read only memory ROM, random access memory RAM, electrically programmable read only memory EPROM, high speed clock, analog to digital (A/D) and digital to analog (D/A) circuitry, input/output circuitry and devices (I/O), and appropriate signal conditioning and buffer circuitry. ECM 12 is shown in FIG. 1 having a plurality of sensor inputs utilized in the present invention and which may be used in other engine control routines including engine speed ($N_{eng}$), turbocharger shaft speed ($\omega_{shaft}$), mass airflow (MAF), manifold absolute pressure (MAP), EGR valve position ($EGR_{pos}$), VNT position ($VNT_{pos}$), ambient air temperature ($T_{amb}$), ambient pressure ($P_{amb}$) from barometric pressure sensor (BARO), engine coolant temperature ($T_{engcoolant}$) and oxygen content from WRAF sensor.

ECM 12 includes non-volatile memory storing program instruction code for implementing the present invention including code for implementing the engine system model comprising the various sub-system models. The model determines, in accordance with the present invention, the oxygen concentration at predetermined points within the internal combustion engine system. One such point within the system having particular utility is at the intake to the combustion chamber. The oxygen concentration within the intake manifold substantially approximates the intake oxygen concentration assuming reasonably homogenous mixing of intake mass flows and volume displacement intake runner dynamics. The intake manifold oxygen concentration is used in conjunction with known intake boost controls (VNT position) or EGR controls (EGR position) to maintain the trapped oxygen to predetermined set-points.

Having thus described a preferred engine system for implementation of the present invention, additional reference is now made to the remaining FIGS. 2 through 5.

Figure 2:
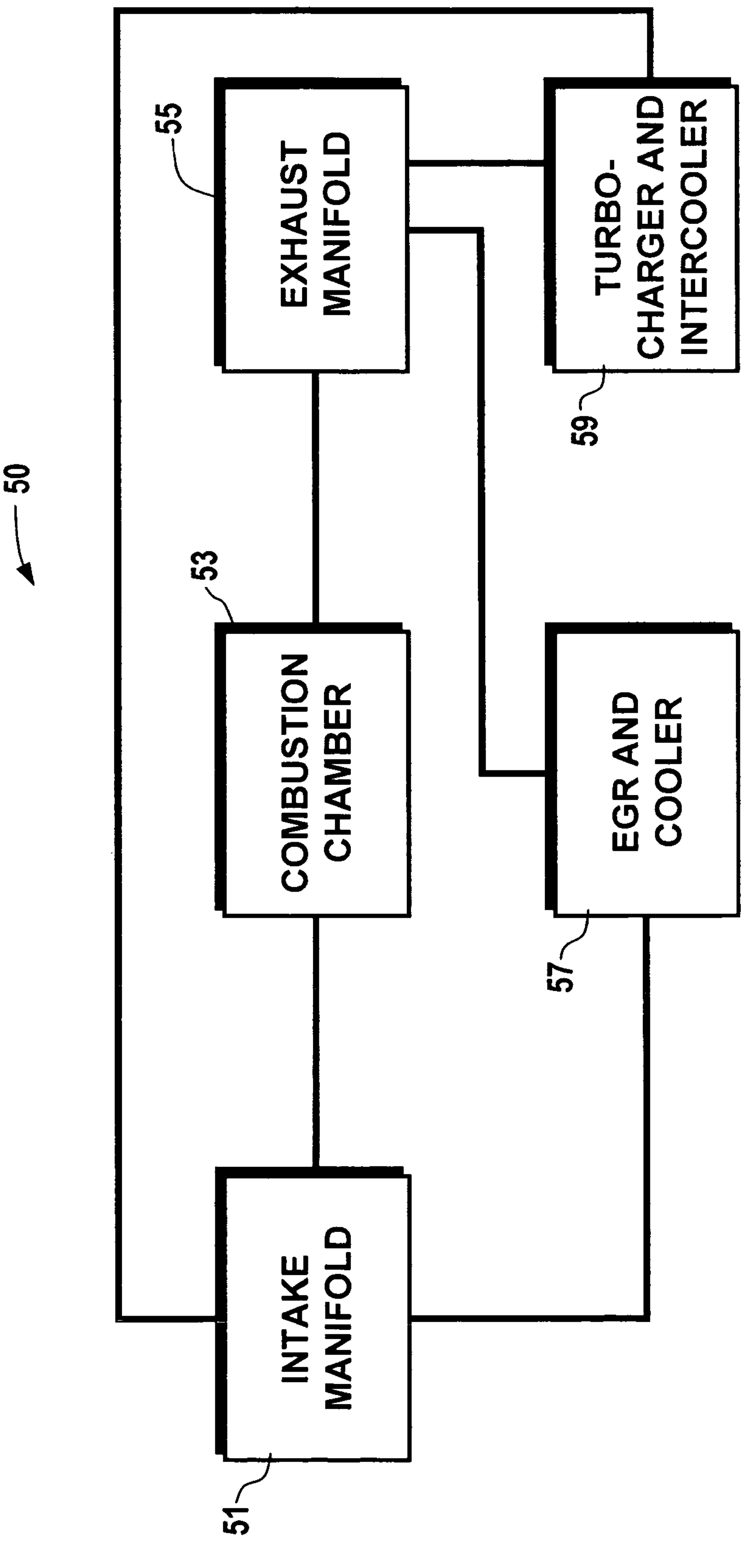
FIG. 2 is a schematic illustration of a model the engine system shown in FIG. 1 reticulated into engine sub-systems.

Generally, the engine system 10 is reticulated into interconnected sub-systems in establishing system model 50 as shown in FIG. 2. System model 50 comprehends, at a minimum, sub-system models of the intake manifold 51, combustion chambers 53, exhaust manifold 55 and exhaust gas recirculation apparatus 57. Additionally as appropriate, sub-system modeling of intake boost apparatus such as the turbocharger and intercooler 59 is comprehended in the system model 50. Interconnections between the various sub-system models 51–59 are shown by solid lines and correspond to various model interactions and interdependencies of model parameters related to sub-system pressures, temperatures and mass flows, for example.

Figure 3A:
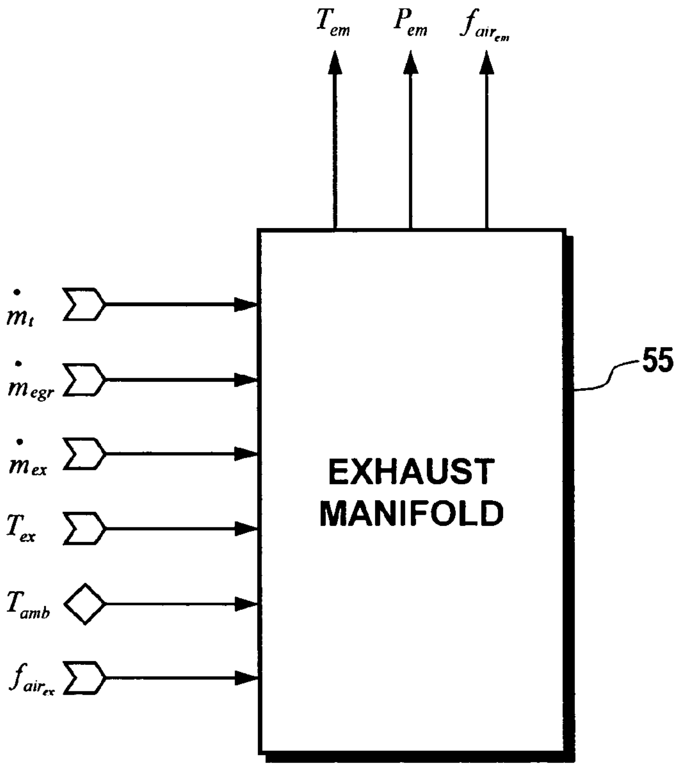
FIG. 3A is a schematic illustration of an exhaust manifold sub-system model including inputs and outputs in accordance with the present invention.

The specific sub-system models corresponding to the reticulated engine system 10 are now presented in the various FIGS. 3A through 3E. Beginning first with the exhaust manifold model 55, FIG. 3A illustrates along the left side of the model block a plurality of model inputs. Graphically, model inputs that are not provided by other model interdependencies are designated by a diamond and may include, for example, various sensed, derived or control quantities of utility in engine controls such as shaft speeds, actuator positions, temperatures, etc. Other quantities used by the models include various calibrations and constants which may appear in more detail in the various modeling equations set forth in further detail herein below. However, such calibrations and constants are not generally shown in the corresponding model figures. FIG. 3A also illustrates along the top side of the model block a plurality of model outputs. The model outputs provide inputs to other of the sub-system models as will become apparent with additional description and reference to additional figures. The exhaust manifold is a significant pressure node in the engine system characterized by significant volume and significant mass flows into and out of the manifold. The exhaust manifold model 55 utilizes the significant mass flows associate with the exhaust manifold and thermal inputs in describing the temperature and pressure associated with the exhaust manifold gas mass. The significant mass flows are identified as those into the exhaust manifold from the combustion chamber exhaust, and those out of the exhaust manifold comprising the EGR flow and the remainder exhausted to atmosphere. In the present example, the remainder exhausted to atmosphere is the turbocharger turbine mass flow used to drive the turbocharger. The following algebraic and differential modeling equations describe the exhaust manifold:

$$\frac{dm_{em}}{dt} = \dot{m}_{ex} - \dot{m}_{egr} - \dot{m}_t \quad (1)$$

$$\frac{dP_{em}}{dt} = \frac{R_{em}}{c_{v_{em}} V_{em}}\left[\dot{m}_{ex} T_{ex} c_{p_{ex}} - (\dot{m}_{egr} + \dot{m}_t) T_{em} c_{p_{em}} - \dot{Q}_{em}\right] \quad (2)$$

$$\dot{Q}_{em} = h_{tem} A_{em} (T_{em} - T_{amb}) \quad (3)$$

$$T_{em} = \frac{P_{em} V_{em}}{m_{em} R_{em}} \quad (4)$$

where

- $m_{em}$ is the resident mass in the exhaust manifold,
- $\dot{m}_{ex}$ is the exhaust mass flow from the combustion chambers,
- $\dot{m}_{egr}$ is the EGR mass flow,
- $\dot{m}_t$ is the turbocharger turbine mass flow,
- $P_{em}$ is the exhaust manifold pressure,
- $R_{em}$ is the gas constant for exhaust manifold conditions,
- $c_{v_{em}}$ is the specific heat at constant volume for the exhaust manifold,
- $V_{em}$ is the exhaust manifold volume,
- $T_{ex}$ is the mass averaged exhaust port flow temperature,
- $c_{p_{ex}}$ is the specific heat at constant pressure exhaust port flow conditions,
- $T_{em}$ is the exhaust manifold temperature,
- $c_{p_{em}}$ is the specific heat at constant pressure exhaust manifold conditions,
- $\dot{Q}_{em}$ is the exhaust manifold heat loss rate,
- $h_{tem}$ is the heat transfer coefficient for the exhaust manifold,
- $A_{em}$ is the heat transfer area for the exhaust manifold, and
- $T_{amb}$ is the ambient temperature.

The ambient temperature, $T_{amb}$, is preferably provided by conventional temperature sensing apparatus adapted to provide a measure of outside air temperature.

The exhaust manifold is more particularly described in accordance with air mass fractions as described in the following algebraic and differential modeling equations:

$$\frac{dm_{em_{air}}}{dt} = \dot{m}_{ex} f_{air_{ex}} - (\dot{m}_t + \dot{m}_{egr}) f_{air_{em}} \quad (5)$$

$$f_{air_{em}} = \frac{R_{em_{air}}}{m_{em}} \quad (6)$$

where

- $m_{em_{air}}$ is the resident air mass in the exhaust manifold,
- $f_{air_{ex}}$ is the fraction of air in the combustion chamber exhaust port flow, and
- $f_{air_{em}}$ is the fraction of air in the exhaust manifold.

Figure 3B:
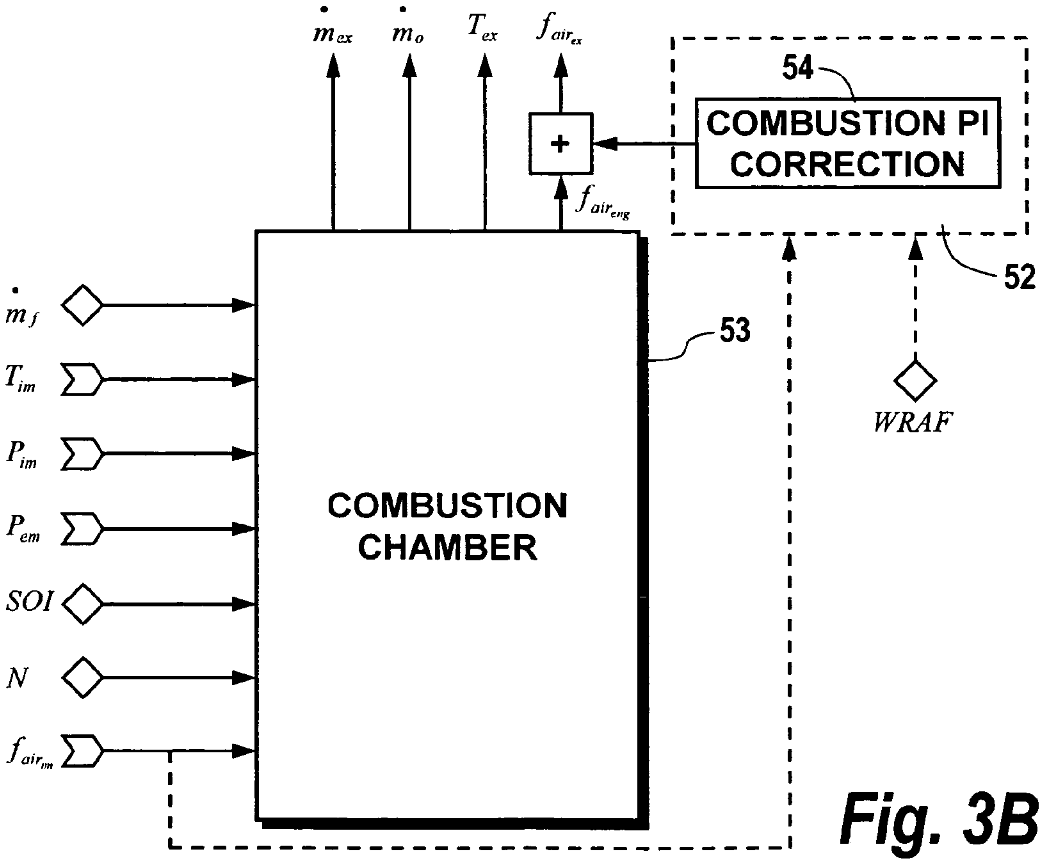
FIG. 3B is a schematic illustration of a combustion chamber sub-system model including inputs and outputs in accordance with the present invention.

The combustion chamber model 53 is illustrated in FIG. 3B wherein a plurality of model inputs appear along the left side of the model block and a plurality of model outputs are illustrated along the top side of the model block. The combustion chambers are pumping apparatus for effecting mass flow by way of the combustion forces produced therein and a source of heat added to the exhausted gases. Combustion chamber model 53 utilizes mass flows associated with the combusted fuel, thermal input associated with the ingested intake gases, pressures associated with the intake and exhaust manifolds and combustion timing in describing the intake and exhaust port mass flows and the temperature associated with the exhaust manifold gas mass. The following modeling equations describe the combustion chambers:

$$\dot{m}_o = F_{engflow}(N, \dot{m}_f, P_{im}, T_{im}, P_{em}) \quad (7)$$

$$\dot{m}_{ex} = (\dot{m}_o + \dot{m}_f)(t - \tau_{comb}) \quad (8)$$

$$T_{ex} = F_{engtemp}(N, \dot{m}_f, SOI, P_{im}, T_{im}, P_{em}) \quad (9)$$

where $\dot{m}_o$ is the mass flow into the combustion chambers, $F_{engflow}(\bullet)$ is a map modeling volumetric efficiency, N is engine rotational speed, $\dot{m}_f$ is fuel flow rate, $P_{im}$ is the intake manifold pressure, $T_{im}$ is the intake manifold temperature, $P_{em}$ is the exhaust manifold pressure, $\dot{m}_{ex}$ is the exhaust mass flow from the combustion chambers, t is time, $\tau_{comb}$ is the combustion cycle delay, $T_{ex}$ is the mass averaged exhaust port flow temperature, $F_{engtemp}(\bullet)$ is a map modeling engine temperature rise, and SOI is the fuel injector timing.

The fuel flow rate, $\dot{m}_f$, is provided by the ECM in accordance with it engine control routines. The maps modeling volumetric efficiency, $F_{engflow}(\bullet)$, and engine temperature rise, $F_{engtemp}(\bullet)$, are preferably provided in stored data sets within the engine controller and are constructed using empirically determined data from conventional dynamometric engine testing over a variety of speed and load points of interest for fuel and emission economy and across the variety of parameters or variables represented in the mapping. The fuel injector timing, SOI, is also provided by the ECM in accordance with it engine control routines.

It is noted that the modeling equation for exhaust mass flow from the combustion chambers, $\dot{m}_{ex}$, additionally accounts for combustion transport or cycle delay as represented in the model equation (8) temporal term set forth as $(t-\tau_{comb})$.

The combustion chambers are more particularly described in accordance with the exhausted air mass fractions as described in the following modeling equation:

$$f_{air_{eng}}=F_{engair}(N,\dot{m}_f,SOI,P_{im},T_{im},P_{em},f_{air_{im}}) \tag{10}$$

where $f_{air_{eng}}$ is the dynamically predicted air fraction of the combustion chamber exhaust, $F_{engair}(\bullet)$ is a map modeling the air content of the combustion chamber exhaust, and $f_{air_{im}}$ is the fraction of air in the intake manifold.

The map modeling combustion chamber exhaust, $F_{engair}(\bullet)$, is preferably provided in stored data sets within the engine controller and are constructed using empirically determined data from conventional dynamometric engine testing.

Preferably for model robustness accounting for such factors as engine system aging, manufacturing variation and modeling errors, a correction term 54 is applied to the predicted air fraction of the combustion chamber exhaust, $f_{air_{eng}}$, from the combustion chamber model 53. A conventional closed-loop, proportional-integral operation 52 is performed as shown in additional detail in FIG. 5 utilizing the signal from wide range air-fuel sensor 30, WRAF, and the fraction of air in the exhaust manifold, $f_{air_{em}}$, from the exhaust manifold model 55. The PI control is set forth below in equation form for convenience:

$$f_{air_{ex}}=f_{air_{eng}}+K_p(WRAF_{air}-f_{air_{em}})+K_i\int(WRAF_{air}-f_{air_{em}})\,dt \tag{11}$$

where $f_{air_{ex}}$ is the fraction of air in the exhaust port flow, $f_{air_{eng}}$ is the dynamically predicted air content in the combustion chamber exhaust, $K_p$ is the proportional gain term, $WRAF_{air}$ is sensed air (calculated from oxygen) in the exhaust manifold, $f_{air_{em}}$ is the fraction of air in exhaust manifold, and $K_i$ is the integral gain term.

Figure 3C:
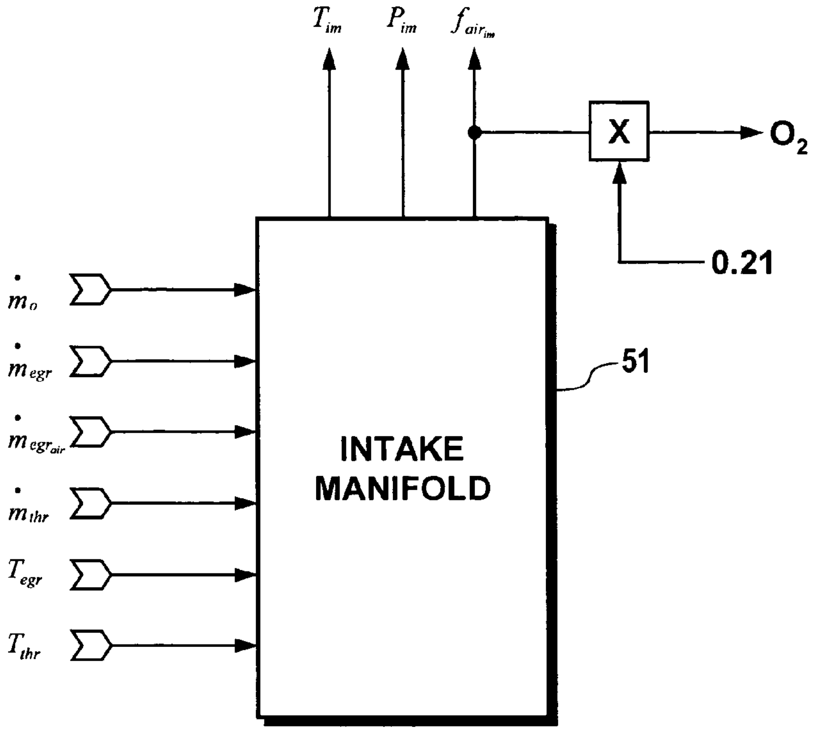
FIG. 3C is a schematic illustration of an intake manifold sub-system model including inputs and outputs in accordance with the present invention.

The intake manifold model 51 is illustrated in FIG. 3C wherein a plurality of model inputs appear along the left side of the model block and a plurality of model outputs are illustrated along the top side of the model block. The intake manifold is a significant pressure node in the engine system characterized by significant volume and significant mass flows into and out of the manifold. The intake manifold model 51 utilizes the significant mass flows associate with the intake manifold and thermal inputs in describing the temperature and pressure associated with the intake manifold gas mass. The significant mass flows are identified as those into the combustion chamber from the intake manifold, and those into the intake manifold comprising the EGR flow and the fresh air intake. In the present example, the fresh air intake is the turbocharger boosted compressor mass flow. The following algebraic and differential modeling equations describe the intake manifold:

$$\frac{dm_{im}}{dt}=\dot{m}_{thr}+\dot{m}_{egr}+\dot{m}_o \tag{12}$$

$$\frac{dP_{im}}{dt}=\frac{R_{im}}{c_{v_{im}}V_{im}}\left[\dot{m}_{thr}T_{thr}c_{p_{im}}+\dot{m}_{egr}T_{egr}c_{p_{egr}}-\dot{m}_oT_{im}c_{p_{im}}\right] \tag{13}$$

$$T_{im}=\frac{P_{im}V_{im}}{R_{im}m_{im}} \tag{14}$$

where $m_{im}$ is the resident mass in the intake manifold, $\dot{m}_{thr}$ is the throttle mass flow, $\dot{m}_{egr}$ is the EGR mass flow, $\dot{m}_o$ is the mass flow into the cylinders, $P_{im}$ is intake manifold pressure, $R_{im}$ is the gas constant for standard atmospheric conditions, $c_{v_{im}}$ is the specific heat at constant volume for the intake manifold, $V_{im}$ is the intake manifold volume, $T_{thr}$ is throttle downstream flow temperature, $T_{egr}$ is the EGR inlet temperature for the intake manifold, $c_{p_{egr}}$ is the specific heat at constant pressure of downstream EGR flow, $T_{im}$ is the intake manifold temperature, and $c_{p_{im}}$ is the specific heat at constant pressure for the intake manifold.

It is presently assumed that throttle valve dynamics are limited and hence approximate static conditions. Therefore, the throttle mass flow, $\dot{m}_{thr}$, is obtained in the present embodiment from the mass airflow sensor, MAF. The same throttle valve dynamics assumption allows for setting the throttle downstream flow temperature, $T_{thr}$, to the intercooler outlet temperature, $T_{ic_{out}}$, in the present embodiment.

The intake manifold is more particularly described in accordance with air mass fractions as described in the following algebraic and differential modeling equations:

$$\frac{dm_{im_{air}}}{dt}=\dot{m}_{thr}+\dot{m}_{egr}-f_{air_{im}}\dot{m}_o \tag{15}$$

-continued $$f_{air_{im}} = \frac{m_{im_{air}}}{m_{im}} \quad (16)$$

where $m_{im_{air}}$ is the resident air mass in the intake manifold, $\dot{m}_{egr_{air}}$ is the EGR airflow, and $f_{air_{im}}$ is the fraction of air in the intake manifold.

In the present embodiment, the quantity, $\dot{m}_{egr_{air}}$, which represents the air mass in the EGR flow to the intake manifold, is provided by the EGR and cooler model 57 as set forth in further detail herein below.

Figure 3D:
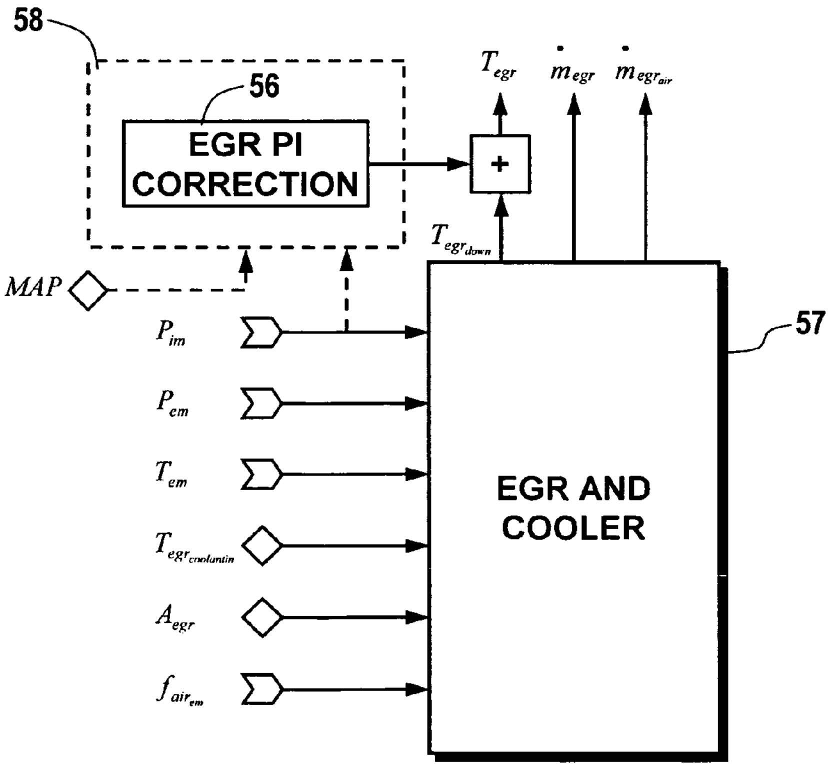
FIG. 3D is a schematic illustration of an EGR and cooler sub-system model including inputs and outputs in accordance with the present invention.

The EGR and cooler model 57 is illustrated in FIG. 3D wherein a plurality of model inputs appear along the left side of the model block and a plurality of model outputs are illustrated along the top side of the model block. The EGR is a controllably restrictive apparatus for affecting mass flow and the cooler is a heat transfer apparatus for removing heat from the mass flow. EGR and cooler model 57 utilizes pressures associated with the intake and exhaust manifolds, thermal input associated with the exhaust manifold gases and the cooler coolant in describing the temperature associated with the EGR into the intake manifold and the EGR mass flows into the intake manifold. The following modeling equations describe the EGR and cooler:

$$\dot{m}_{egr} = C_{d_{egr}} A_{egr} \frac{P_{em}}{\sqrt{R_{egr} T_{egr_{up}}}} \phi\left(\frac{P_{im}}{P_{em}}\right) \quad (17)$$

where $$\phi(x) = \begin{cases} \left\{ \left(\frac{2}{\gamma_{egr_{up}} - 1}\right) \left[ x^{\frac{2}{\gamma_{egr_{up}}}} - x^{\frac{\gamma_{egr_{up}}+1}{\gamma_{egr_{up}}}} \right] \right\}^{0.5} & \text{for } x > \left(\frac{2}{\gamma_{egr_{up}} + 1}\right)^{\frac{\gamma_{egr_{up}}}{\gamma_{egr_{up}}-1}} \\ \left\{ \gamma_{egr_{up}} \left[ \frac{2}{\gamma_{egr_{up}} + 1} \right]^{\frac{\gamma_{egr_{up}}+1}{\gamma_{egr_{up}}-1}} \right\} & \text{for } x \le \left(\frac{2}{\gamma_{egr_{up}} + 1}\right)^{\frac{\gamma_{egr_{up}}}{\gamma_{egr_{up}}-1}} \end{cases} \quad (18)$$

$$T_{egr_{up}} = \eta_{egrcooler}(T_{egrcoolant_{in}} - T_{em}) + T_{em} \quad (19)$$

$$T_{egr_{down}} = F_{egr}\left(T_{egr_{up}}, \frac{P_{im}}{P_{em}}\right) \quad (20)$$

where $\dot{m}_{egr}$ is the EGR mass flow, $C_{d_{egr}}$ a EGR valve discharge coefficient, $A_{egr}$ is EGR valve geometric opening area, $P_{em}$ is the exhaust manifold pressure, $R_{egr}$ is the gas constant for EGR, $T_{egr_{up}}$ is EGR temperature at the cooler outlet, $T_{egr_{down}}$ is EGR temperature downstream of the EGR valve at the inlet to the intake manifold, $P_{im}$ is intake manifold pressure, $\phi$ is the pressure ratio effect in compressible flow equation, $\gamma_{egr_{up}}$ is the ratio of specific heats for EGR flow upstream, $\eta_{egrcooler}$ is the EGR cooler efficiency, $T_{egr_{coolantin}}$ is the EGR coolant inlet temperature, $T_{em}$ is the exhaust manifold temperature, and $F_{egr}(\bullet)$ is a function that models the EGR downstream temperature.

The EGR valve geometric opening area, $A_{egr}$, is determined as a function of EGR valve position ($EGR_{pos}$). The EGR coolant inlet temperature, $T_{egr_{coolantin}}$, is determined as a function of the engine coolant temperature $T_{engcoolant}$. Alternatively, $T_{egr_{coolantin}}$ may be approximated as a constant. The function modeling EGR downstream temperature, $F_{egr}(\bullet)$, is preferably provided in stored data sets within the engine controller and are constructed using empirically determined data from conventional dynamometric engine testing.

The EGR and cooler are more particularly described in accordance with air mass fractions of the EGR mass flow as described in following modeling equation:

$$\dot{m}_{egr_{air}} = \dot{m}_{egr} f_{air_{em}}(t - \tau_{egr}) \quad (21)$$

where $\dot{m}_{egr_{air}}$ is the EGR airflow, $f_{air_{em}}$ is the fraction of air in exhaust manifold, t is time, and $\tau_{egr}$ is the EGR transport delay.

As previously mention herein above with respect to the intake manifold model 51, it is recognized that the air mass in the EGR flow to the intake manifold, $\dot{m}_{egr_{air}}$, is provided by the EGR and cooler model 57. This is preferred due to the additional accounting performed in the EGR and cooler model for EGR transport delay as represented in the model equation (21) temporal term set forth as $(t - \tau_{egr})$.

Preferably for model robustness accounting for such factors as engine system aging, manufacturing variation and modeling errors, a correction term 56 is applied to the EGR temperature downstream of the EGR valve, $T_{egr_{down}}$, from the EGR and cooler model 57. A conventional closed-loop, proportional-integral operation 58 is performed as shown in additional detail in FIG. 4 utilizing the signal from manifold absolute pressure sensor 17, MAP, and the intake manifold pressure, $P_{im}$, from the intake manifold model 51. The PI control is set forth below in equation form for convenience:

$$T_{egr} = T_{egr_{down}} + K_p(MAP - P_{im}) + K_i \int (MAP - P_{im}) dt \quad (22)$$

where $T_{egr}$ is the EGR inlet temperature for the intake manifold, $T_{egr_{down}}$ is the estimated EGR inlet temperature, $K_p$ is the proportional gain term, MAP is sensed manifold pressure, $P_{im}$ is the intake manifold pressure, and $K_i$ is the integral gain term.

Figure 3E:
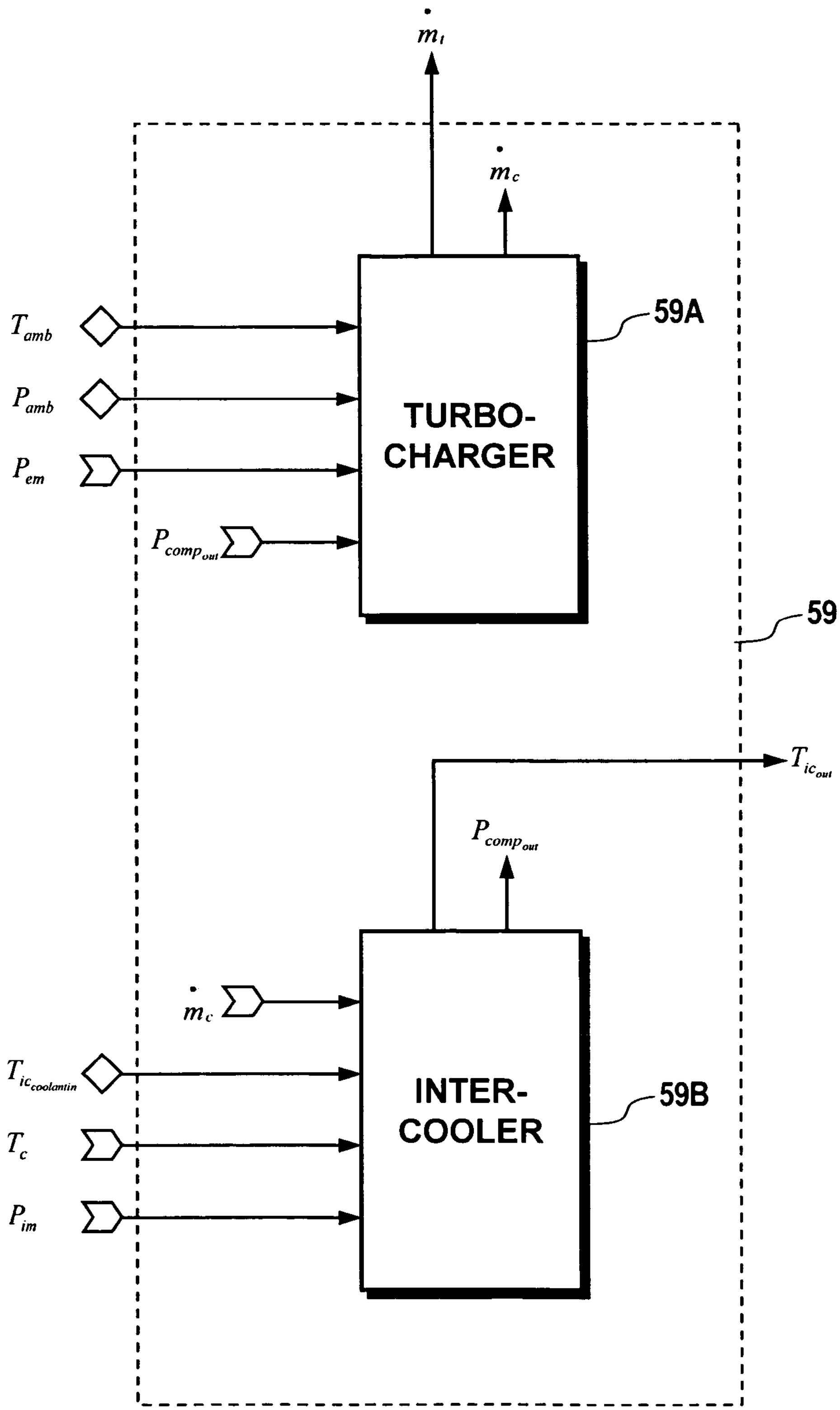
FIG. 3E is a schematic illustration of a turbocharger and intercooler sub-system model including inputs and outputs in accordance with the present invention.

The turbocharger and intercooler model 59 is illustrated in FIG. 3E wherein a plurality of model inputs appear along the left sides of the respective sub-model blocks 59A and 59B and a plurality of model outputs are illustrated along the top side of the respective sub-model blocks. The turbocharger is a pumping apparatus for effecting mass flow by way of exhaust gas forces operating upon a turbine/compressor combination and the intercooler is considered to be a heat transfer apparatus for removing heat from the mass flow. Turbocharger and intercooler model 59 utilizes pressures associated with the intake and exhaust manifolds, thermal input associated with the ambient air source and the intercooler coolant in determining the exhaust mass flow driving the turbocharger and the temperature associated with the boosted mass flow to the intake manifold. The following modeling equations describe the EGR and cooler:

$$\dot{m}_c = F_{compflow}\left(\omega_{shaft}, \frac{P_{compout}}{P_{amb}}\right) \tag{23}$$

$$\eta_c = F_{compeff}\left(\omega_{shaft}, \frac{P_{compout}}{P_{amb}}\right) \tag{24}$$

$$\dot{m}_t = F_{turbflow}\left(\omega_{shaft}, \frac{P_{em}}{P_{amb}}, VNT_{pos}\right) \tag{25}$$

$$\eta_t = F_{turbeff}\left(\omega_{shaft}, \frac{P_{em}}{P_{amb}}, VNT_{pos}\right) \tag{26}$$

$$T_{q_{comp}} = \frac{\dot{m}_c c_p T_{amb}}{\eta_c \omega_{shaft}}\left\{\left(\frac{P_{compout}}{P_{amb}}\right)^{\frac{\gamma-1}{\gamma}} - 1\right\} \tag{27}$$

$$T_{q_{turb}} = \frac{\dot{m}_t c_{pem} T_{amb}}{\eta_t \omega_{shaft}}\left\{1 - \left(\frac{P_{amb}}{P_{em}}\right)^{\frac{\gamma_{em}-1}{\gamma_{em}}}\right\} \tag{28}$$

$$I_{tc}\dot{\omega}_{shaft} = T_{q,turb} - T_{q,comp} \tag{29}$$

$$T_{ic_{out}} = \eta_{IC}(T_{iccoolant_{in}} - T_c) + T_c \tag{30}$$

$$P_{compout} = F_{ICdelP}(\dot{m}_c) + P_{im} \tag{31}$$

where

- $\dot{m}_c$ is compressor mass flow,
- $F_{compflow}(\bullet)$ is a two dimensional map modeling compressor mass flow,
- $\omega_{shaft}$ is turbocharger shaft speed,
- $P_{compout}$ is compressor outlet pressure,
- $P_{amb}$ is ambient pressure,
- $\eta_c$ is compressor efficiency,
- $F_{compeff}(\bullet)$ is a two dimensional map modeling compressor efficiency,
- $\dot{m}_t$ is the turbine mass flow,
- $F_{turbflow}(\bullet)$ is a three dimensional map modeling turbine mass flow,
- $P_{em}$ is the exhaust manifold pressure,
- $VNT_{pos}$ is the VNT valve position,
- $\eta_t$ is turbine efficiency,
- $F_{turbeff}(\bullet)$ is a three dimensional map modeling turbine efficiency,
- $T_{q_{comp}}$ is compressor torque,
- $c_p$ is the specific heat at constant pressure for standard atmospheric conditions,
- $T_{amb}$ is ambient temperature,
- $\gamma$ is the ratio of specific heats for ambient conditions,
- $T_{q_{turb}}$ is turbine torque,
- $c_{pem}$ is the specific heat at constant pressure for exhaust manifold conditions,
- $\gamma_{em}$ is the ratio of specific heats for exhaust manifold conditions,
- $I_{tc}$ is turbocharger inertia,
- $T_{ic_{out}}$ is the intercooler outlet temperature,
- $\eta_{IC}$ is the intercooler efficiency,
- $T_{iccoolant_{in}}$ is the intercooler coolant inlet temperature,
- $T_c$ is the temperature of the compressor outlet,
- $F_{ICdelP}(\bullet)$ is a correlation function that relates pressure drop along the intercooler to mass flow rates, and
- $P_{im}$ is intake manifold pressure.

The ambient temperature, $T_{amb}$, is provided by the ambient air temperature sensor. The ambient pressure, $P_{amb}$, is provided by the BARO sensor. The intercooler coolant inlet temperature, $T_{iccoolant_{in}}$, is a function of the ambient air temperature in the present embodiment as provided by the ambient temperature sensor, $T_{amb}$. Alternately, the intercooler coolant inlet temperature, $T_{iccoolant_{in}}$, may be may be approximated as a constant. The intercooler efficiency, $\eta_{IC}$, is a regression based on engine data. The two dimensional map modeling compressor mass flow, $F_{compflow}(\bullet)$, is preferably provided in stored data sets within the engine controller and are constructed using empirically determined data from a flow test bench of the turbocharger. The two dimensional map modeling compressor efficiency, $F_{compeff}(\bullet)$, is preferably provided in stored data sets within the engine controller and are constructed using empirically determined data from a flow test bench of the turbocharger. The three dimensional map modeling turbine mass flow, $F_{turbflow}(\bullet)$, is preferably provided in stored data sets within the engine controller and are constructed using empirically determined data from a flow test bench of the turbocharger. The three dimensional map modeling turbine efficiency, $F_{turbeff}(\bullet)$, is preferably provided in stored data sets within the engine controller and are constructed using empirically determined data from a flow test bench of the turbocharger. The correlation function that relates pressure drop along the intercooler to mass flow rates, $F_{ICdelP}(\bullet)$, is preferably provided in stored data sets within the engine controller and are constructed using empirically determined data from conventional dynamometric engine testing over a variety of speed and load points of interest for fuel and emission economy.

The engine system model comprising the interconnected sub-system models as set forth herein above thus identifies the significant mass flows and pressure nodes within the engine system. Interdependent air mass fractions are modeled at the intake and exhaust manifolds and at the combustion cylinder exhaust port. The oxygen concentration at any point within the system can be determined by applying a simple gain to the air mass fraction at the point of interest. The gain corresponds to the volumetric fraction of oxygen in air and is substantially 0.21. Therefore, the oxygen concentration in the intake manifold is determined by applying this gain to the air mass fraction at the intake manifold.

While the present invention has been described with respect to certain preferred embodiments and particular applications, it is understood that the description set forth herein above is to be taken by way of example and not of limitation. Those skilled in the art will recognize various modifications to the particular embodiments are within the scope of the appended claims. Therefore, it is intended that the invention not be limited to the disclosed embodiments, but that it has the full scope permitted by the language of the following claims.

The invention claimed is:

1. Control system for an internal combustion engine including a combustion chamber, an exhaust manifold, an intake manifold and exhaust gas recirculation apparatus for variable recirculation of exhaust gases from the exhaust manifold to the intake manifold, comprising:

means for providing respective measures of a plurality of engine operating parameters;

a microprocessor based controller including computer code stored in a storage medium for applying the engine operating parameter measures to a model to estimate interdependent air mass fractions at locations within the internal combustion engine; and at least one actuator controlled in response to at least one of said interdependent air mass fractions.

2. The control system as claimed in claim 1 wherein one of said interdependent air mass fractions is estimated at the intake manifold and said at least one actuator comprises an intake boost control actuator.

3. The control system as claimed in claim 2 wherein said intake boost control actuator comprises a variable geometry turbocharger actuator.

4. The control system as claimed in claim 2 wherein said intake boost control actuator comprises a variable nozzle turbocharger actuator.

5. The control system as claimed in claim 1 wherein one of said interdependent air mass fractions is estimated at the intake manifold and said at least one actuator comprises an exhaust gas recirculation actuator.

6. Method for estimating oxygen concentration at points within an internal combustion engine system including a combustion chamber, an exhaust manifold, an intake manifold and exhaust gas recirculation apparatus for variable recirculation of exhaust gases from the exhaust manifold to the intake manifold, comprising reticulating the engine system into a plurality of interconnected engine sub-systems;

modeling the interconnected engine sub-systems to provide interdependent air mass fractions at predetermined points within the internal combustion engine; and estimating oxygen concentration at said predetermined points within the internal combustion engine as a function of the respective modeled air mass fractions at said predetermined points.

7. The method for estimating oxygen concentration as claimed in claim 6 wherein modeling interdependent air mass fractions at predetermined points within the internal combustion engine includes modeling the air mass fraction at the combustion chamber exhaust mass flow from an empirically determined data set correlating combustion chamber air mass fraction to a plurality of engine operating parameters.

8. The method for estimating oxygen concentration as claimed in claim 7 wherein said plurality of engine operating parameters comprises engine speed, fuel mass flow, combustion timing, intake manifold pressure, exhaust manifold pressure, intake manifold temperature and intake manifold air fraction.

9. Method for estimating oxygen concentration in an intake manifold of an internal combustion engine system including an exhaust manifold and exhaust gas recirculation apparatus for variable recirculation of exhaust gases from the exhaust manifold to the intake manifold, comprising reticulating the engine system into a plurality of interconnected engine sub-systems including an intake manifold, an exhaust manifold, an exhaust gas recirculation apparatus and combustion chambers;

identifying all significant mass flows corresponding to said engine sub-systems including combustion chamber exhaust mass flow;

identifying all significant pressure nodes corresponding to said engine sub-systems including the intake manifold and exhaust manifold;

modeling interdependent air mass fractions at a) the identified pressure nodes including the air mass fraction at the intake manifold, and b) the combustion chamber exhaust mass flow; and estimating oxygen concentration in the intake manifold as a function of the modeled air mass fraction at the intake manifold.

10. The method for estimating oxygen concentration as claimed in claim 9 wherein engine sub-systems include intake pressure boost apparatus.

11. The method for estimating oxygen concentration as claimed in claim 9 wherein:

modeling interdependent air mass fractions at the identified pressure nodes includes modeling the air mass fraction at the exhaust manifold; and modeling the air mass fraction at the intake manifold includes determining recirculated exhaust gas mass flow and determining recirculated exhaust gas air mass flow based on the recirculated exhaust gas mass flow and the air mass fraction at the exhaust manifold.

12. The method for estimating oxygen concentration as claimed in claim 11 wherein:

determining recirculated exhaust gas mass flow includes factoring an exhaust gas recirculation transport delay.

13. The method for estimating oxygen concentration as claimed in claim 11 wherein:

modeling the air mass fraction at the combustion chamber exhaust mass flow includes factoring a combustion transport delay; and determining recirculated exhaust gas mass flow includes factoring an exhaust gas recirculation transport delay.

14. The method for estimating oxygen concentration as claimed in claim 9 wherein:

modeling the air mass fraction at the combustion chamber exhaust mass flow includes factoring a combustion transport delay.

* * * * *